United States Patent [19]

Hynes

[11] Patent Number: 4,479,669
[45] Date of Patent: Oct. 30, 1984

[54] PIPE CONNECTOR WITH THREADED LATCH SCREWS

[75] Inventor: Joseph H. Hynes, Houston, Tex.

[73] Assignee: Hydril Company, Los Angeles, Calif.

[21] Appl. No.: 364,392

[22] Filed: Apr. 1, 1982

[51] Int. Cl.³ .................... F16L 25/00; F16L 17/00; F16L 21/00
[52] U.S. Cl. ............................. 285/332.3; 285/351; 285/404
[58] Field of Search ............... 285/24, 27, 39, 332.3, 285/351, 347, 404, 403

[56] References Cited

U.S. PATENT DOCUMENTS 3,183,024  5/1965  Myers et al. ............... 285/404 X
3,472,538 10/1969  Vincent et al. ............ 285/403 X
4,124,231 11/1978  Ahlstone .................... 285/404 X Primary Examiner—Richard J. Scanlan, Jr.
Attorney, Agent, or Firm—Dodge & Bush

[57] ABSTRACT

A connector for releasably securing end pin and box portions of adjacent pipe sections in a telescopic relationship along aligned longitudinal axis to provide an internal fluid flow passageway. One of the end portions is provided with a plurality of threaded openings disposed in a radial relationship about the longitudinal axis and adjacent the other end portion, the other end portion having a similar plurality of openings that align with the threaded openings when the end portions are positioned for connection, each of said thread openings having a threaded latch screw operably positioned therein for movement to extend from said threaded opening into the aligned opening on the other end portion for securing the end portion together.

7 Claims, 3 Drawing Figures

PIPE CONNECTOR WITH THREADED LATCH SCREWS

BACKGROUND OF THE INVENTION

This invention relates to pipe connectors and, more particularly, to a connector which can be used to form a strong mechanical connection between relatively large diameter pipe sections.

The connector which is the subject of this invention is useful for connecting pipe sections with relatively large diameters which can be used as conductor pipes for subsea oil or gas wells. For pipes which have relatively large diameters, e.g. from 20–30" O.D., connector sections are normally formed independent of the pipe sections and then welded onto adjacent ends of longer lengths of pipe.

Connectors for these large diameter lengths of pipe ideally have a minimum number of major parts and can provide a rigid connection between the adjacent pipe sections. It is particularly advantageous that the pipe sections can be driven by a pile driver after adjacent lengths are connected. It is also advantageous to be able to ship pipe with the connectors welded onto them with all the connector parts in place so that no extra assembling steps need to be performed on the rig.

On many rigs, adjacent lengths of casing used below the mud line are normally welded together. A mechanical connection between such lengths of pipe would save considerable time and expense, increase safety, and lessen any fire danger from welding operations.

SUMMARY OF THE INVENTION

The subject invention is directed to a mechanical connection which is particularly useful for large diameter pipe sections that provides the advantages outlined above. The connection includes end sections for first and second adjacent lengths of pipe. The end sections are shaped and dimensioned so that the end section of the first length of pipe is formed as a pin and can be inserted in the end section of the second length of pipe which is formed as a box. Penetration of the pin section into the box section is limited by cooperating surfaces located circumferentially around the box and pin sections. The respective inner surfaces of the box and pin are designed so that when the joint is made up, the two sections form a smooth inner surface along the connection.

A plurality of threaded holes are located circumferentially around the outer surface of the pin section, each such hole receiving a threaded latch screw which has threads on its outer surface that mate with the threads in the holes. The threaded latch screws are screwed into the holes until the heads of the latch screws are at least flush with or below the outer surface of the pin section so that the box section can be lowered over and overlap the outer surface of the pin section. If the latch screws are screwed tight in the bottom of their respective holes, they will remain there and not loosen during shipment or handling of the joint.

The box section has a plurality of openings extending therethrough which are located so that when the box section overlaps the pin section the openings are aligned with the threaded latch screws and expose the latch screws from the exterior of the connection. The exposed portion of the threaded latch screws include a socket which can be engaged by a wrench for rotating the screw and moving them outwardly into the openings for connecting the lengths of pipe together. The outer portion of the threaded latch screws and the openings in the box section are formed with cooperating tapered surfaces so that when the threaded latch screws are screwed outwardly into the openings, the cooperating tapered surfaces engage each other and provide a rigid connection between the adjacent lengths of pipe.

The outer end of the pin section and inner surface of the box section are dimensioned so that when the pin section is inserted into the box section, at least a portion of the cooperating surfaces between them stand apart by a very narrow gap. Various embodiments can be used to accomplish this including cooperating tapered or sloping surfaces which initially contact each other with a slight gap between the outer end of the pin end and a shoulder on the inner surface of the box, or where the inner and outer cooperating pin and box surfaces are coaxial with the pipe sections and initial contact can be made between the outer end of the pin and inner shoulder of the box with a gap formed between the outer end of the box and a shoulder on the outer surface of the pin.

When the pin and box are in this position, the openings in the box section which are adapted to receive the threaded latch screws are located relative to the threaded latch screws so that when the threaded latch screws are screwed outwardly the tapered surfaces of the threaded latch screws first contact the edge of the tapered openings away from the outer end of the pin section. When the threaded screws are screwed outwardly, the box section moves slightly outwardly and downward, and causes the gap to close preloading the connection.

An alignment or guide pin can be provided on the outer surface of the pin section which cooperates with a slot formed in the lowermost edge of the box section for aligning the openings in the box section with the threaded latch screws as the box section is lowered onto the piston. The slot can have a relatively wide mouth which tapers down at its inner end to a width slightly greater than the diameter of the alignment pin. The alignment pin and slot provide an easy means for aligning the openings in the box member with the threaded latch screws for relatively fast make-up of the joint.

A pair of O-ring seals can be provided as primary and secondary seals between the pin section and box member for insuring a fluid-tight seal at the connection. An optional test port can be formed in the box section between the two seals so that a grease-fitting can be inserted for testing the seal.

The foregoing invention has the advantages of providing a subsea coupling for relatively large diameter lengths of pipe that is formed of only two major parts, the pin section and box section, along with a relatively small number of threaded latch screws which can be shipped in place so no assembly operations are necessary on the rig. Once the pin section is inserted into the box section and they are properly aligned, the joint can easily be made up by applying a power wrench to each of the threaded latch screws and threading them outwardly into place for providing a rigid joint. The few major parts for the coupling make it relatively inexpensive to manufacture and use and provide a strong rigid coupling which allows the pipe sections to be driven.

BRIEF DESCRIPTION OF THE DRAWINGS

A better understanding of the invention can be obtained from the Detailed Description of Preferred Embodiments set forth below taken in conjunction with the following drawings, in which.

DETAILED DESCRIPTION OF PREFERRED EMBODIMENTS

Figure 1:
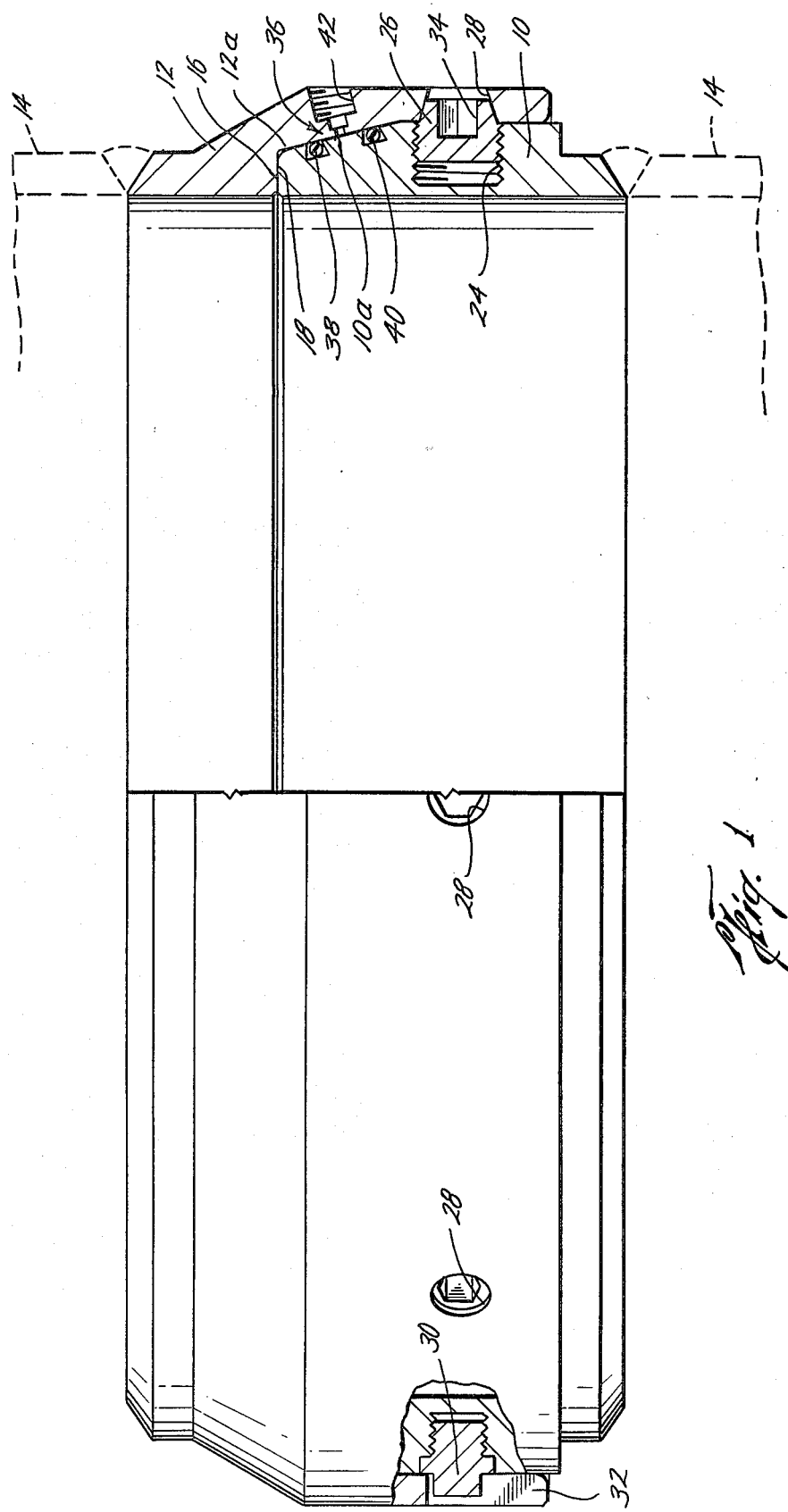
FIG. 1 is an elevation view of the connector which is the subject of this invention, partially in section, which shows in particular one of the threaded screws for connecting the two sections rigidly together and the alignment pin and its cooperating slot.

One preferred embodiment of the subject invention is shown in FIG. 1 where reference numeral 10 refers to a first end section formed as a pin which is adapted to be inserted into a second end section or box 12. The pin and box sections 10 and 12 together form a connector for adjacent lengths of pipe and, as shown by the brpoken lines in FIG. 1, are designed to be welded to elongated lengths of pipe 14. The box section 12 includes a tapered portion 12a and shoulder 16 formed on its inner surface which, when the joint is made-up, engage the cooperating tapered portion 10a and outer end 18 of the pin section. The cooperating surfaces, after make-up, define the maximum penetration of the pin section 10 relative to the box section 12. The cooperating surfaces between the pin 10 and box 12 are formed so that when the pin 10 is inserted into the box 12, the tapered cooperating surfaces designated by reference numerals 10a and 12a, respectively, first engage each other leaving a slight gap between the pin end 18 and shoulder 16, significance of which is discussed below.

The pin section 10 includes a plurality of threaded holes 24 spaced apart circumferentially around the outer surface of the pin section 10. A threaded latch screw 26 is located in each of the holes 24, the latch screw 26 being designed so that when the box section 12 is lowered into place onto the pin section 10, the latch screws 26 can be screwed into the holes 24 so that the outer ends of the latch screws 26 do not project beyond the outer surface of the pin section 10. In this way, the box section 12 can be lowered past the threaded latch screws 26 into the position shown in FIG. 1.

A plurality of openings 28 extend through the box section 12 and are located to be in alignment with the threaded latch screws 26 when the pin section and box section have been stabbed as shown in FIG. 1. This alignment is assured by providing an alignment or guide pin 30 on the outer surface of the pin section 10 (see FIG. 2), the guide pin 30 cooperating with a slot 32 formed in the lower edge of the box section 12. The slot 32 is flared at its outer end and tapers to an opening slightly larger than the diameter of the alignment pin 30 to insure easy alignment between the openings 28 and the threaded latch screw 26. The flared outer end of the slot 32 makes it easier initially to align the slot with the guide pin 30 when the box section 12 is lowered in place.

Figure 2:
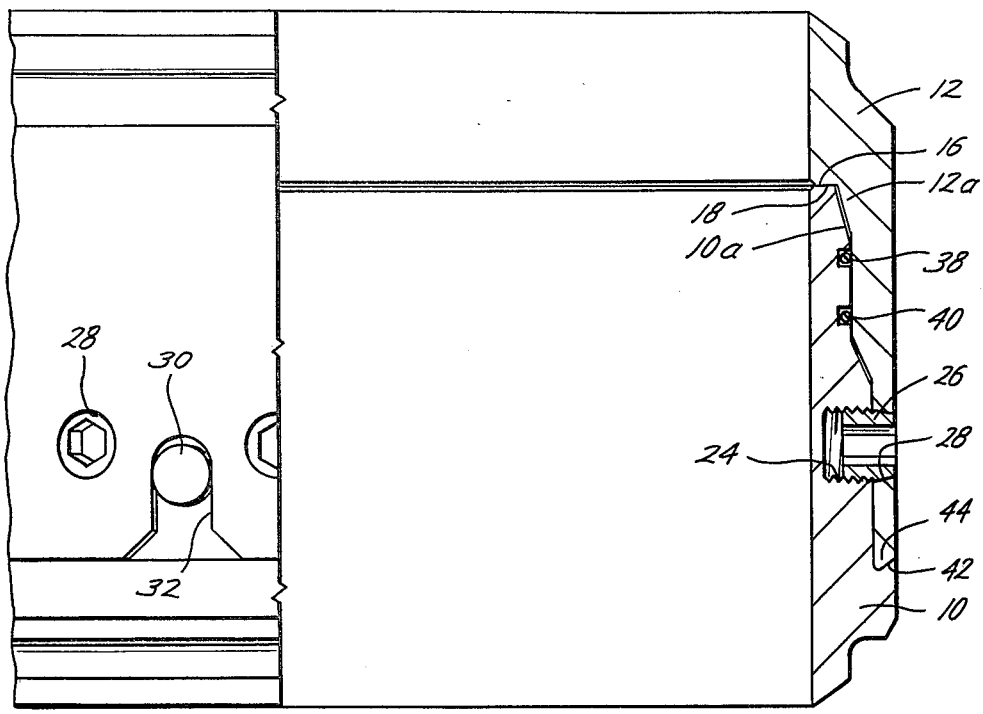
FIG. 2 is a partial sectional view similar to that of FIG. 1 which shows a different embodiment of the invention and particularly shows the alignment pin and slot and the cooperating surfaces between the pin and box sections which are partially coaxial with the pipe sections and partially tapered.
Figure 3:
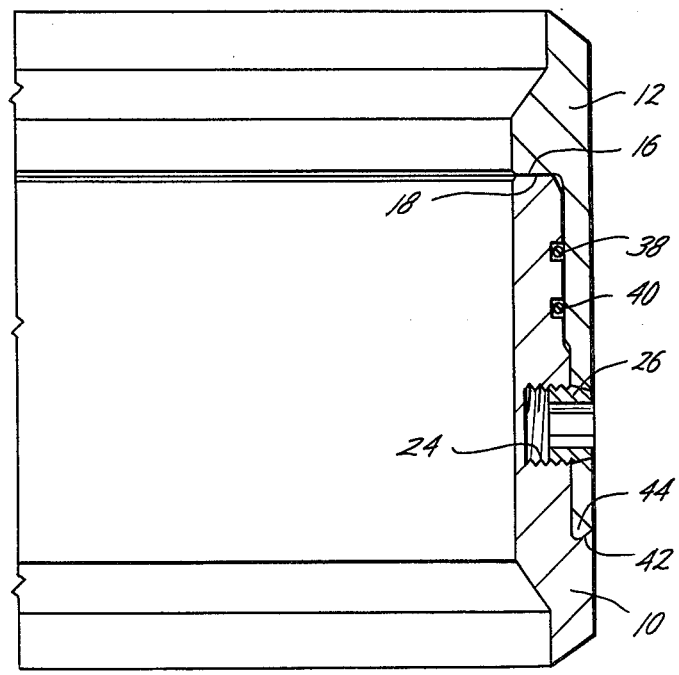
FIG. 3 is a sectional view similar to FIGS. 1 and 2 showing another embodiment of the invention where cooperating surfaces between the pin and box sections are coaxial with the length of pipe.

After the box section 12 is lowered into the position shown in FIG. 1, a power wrench can be used for rotating the threaded latch screws 26 and causing them to move outwardly for connecting the pin section 10 and box section 12 rigidly together. The latch screws preferably have left-hand threads so that clockwise rotation will move them outwardly. Each latch screw 26 includes a wrench socket 34 located on the top which is accessible through the opening 28 or the socket 34 can extend through the entire length of the latch screws 26 as shown in FIGS. 2 and 3. The opening 28 and top portion of each latch screw 26 are formed with cooperating tapered surfaces which engage each other as the latch screw 26 is rotated and unscrewed to move into the opening 28 to the position shown in FIG. 1.

The openings 28 are formed so that when the box section 12 overlaps the pin section 10 the latch screws 26 first engage the lower edge of the opening 28. When the latch screws 26 are unscrewed and move outwardly, they cause the outer end of the box section 12 to move slighty outwardly and downward closing the gap between the shoulder 16 and the pin section outer end 18 and preloading the connection by compressing the pin 10 both radially and longitudinally and placing the box 12 in tension between the shoulder 16 and the tapered surface 28. These forces will create a rigid connection between the pin section 10 and box section 12 after all of the latch screws 26 have been unscrewed and moved to the position shown in FIG. 1. In order to disconnect the adjacent pipe sections, the latch screws 26 are simply rotated in the opposite direction until they are completely retracted into the holes 24, at which time the box section 12 can be removed from the pin section 10. Alternatively, the arrangement could be reversed where the latch screws 26 are carried by threaded holes formed in the box section 12 and screwed into tapered openings formed in the pin section 10 for forming the connection, but the configuration in FIG. 1 is preferred.

A pair of seals in the form of O-rings 38 and 40 are provided as the primary and secondary seals, respectively, for the joint and are located in slots formed around the outer surface of the pin section 10. A test port 42a can be provided to receive a grease fitting so that the seals can be tested before being placed in service.

In the embodiment of the invention shown in FIG. 1, the cooperating outer surface 10a of the pin section 10 and inner surface 12a of the box section 12 are tapered, although those surfaces may be partially tapered and partially coaxial with the pipe sections shown in FIG. 1. These different arrangements can be used for different applications of the invention such as, for example, the embodiment shown in FIG. 1 can be used as a connector for joining lengths of relatively large diameter conductor pipe and for joining a subsea wellhead housing to the last joint of conductor pipe. The embodiment in FIG. 3, for example, can be used in connection with a jack-up drilling rig, from below the mud line to the rig.

In the embodiment of the invention shown in FIGS. 2 and 3, initial contact between the pin 10 and box 12 could be made between the box shoulder 16 and pin end 18, leaving a slight gap between the pin shoulder 42 and box shoulder 44. Tightening of the latch screws 26 would tension the box 12 and bring shoulders 42 and 44 in contact. The embodiment of FIG. 2 could be further modified so that initial contact is made between tapered portions 10a and 12a and a slight gap is formed between pin end 18 and shoulder 16 and between shoulders 42 and 44. Actuating the latch screws 26 would close these gaps and tension the box 12 as well as form a metal-tometal seal between the tapered surfaces 10a and 12a which could be used in addition to or in lieu of O-ring seals 38 and 40.

Thus, there is provided in accordance with the invention a coupling which can be adapted for use in connection with subsea conductor or surface casing on oil and gas wells. The coupling only has two major parts, a pin section and a box section which can be welded to adjacent lengths of large diameter pipe. After the box section is in place over the pin section, the two connector sections are easily connected by rotating a number of threaded latch screws which are retained in threaded openings in the outer surface of the pin section and which are accessible through openings extending through the box section. This connection is extremely strong and rigid and allows the pipes to be driven after the connection is formed. If the threaded latch screws are fully inserted into their respective openings before the lengths of pipe are shipped, there will be no loose parts to assemble which adds to the ease of installation of this particular connector. Furthermore, by reducing the number of primary parts and specially designed components, this connector is relatively inexpensive to manufacture.

It should be understood that those having ordinary skill in the relevant art will be able to make improvements and modifications to the invention and that all such improvements and modifications are contemplated as falling within the scope of the appended claims.

I claim:

1. A connector for mechanically securing first and second pipe sections in a desired force transmitting end to end relationship, comprising:

end portions on the first and second pipe sections which are shaped and dimensioned so that the end portion of the first pipe section can be inserted in the end portion of the second pipe section, stop means for limiting telescopic penetration of the first pipe section relative to the second pipe section, said stop means includes a shoulder formed on an inner surface of the second pipe section and the outer end of the first pipe section which are adapted to engage each other when the first pipe section is inserted in the second pipe section;

cooperating tapered surfaces located respectively on the outer surface of the first pipe section and inner surface of the second pipe section, the tapered surfaces being dimensioned so that when the shoulder and outer end engage each other for limiting relative penetration, a gap is formed between the cooperating tapered surfaces;

one of the pipe sections including a plurality of helically threaded circumferentially spaced holes opening on the side facing the other pipe section;

a corresponding plurality of threaded latch screws with threads for mating with the threads in the holes, the latch screws being shaped and dimensioned to be received into the threaded holes to an extent that the first section can be inserted in the second pipe section;

the other pipe section including a like plurality of circumferentially spaced openings located therein so that when the first pipe section is inserted in the second pipe section the openings will be substantially aligned with the latch screws;

a portion of each latch screw being exposed to the exterior of the second pipe section, and the exposed portion of the latch screws including engaging means so that the latch screws can be engaged and rotated for moving a portion of the latch screws into the substantially aligned openings for longitudinally straining a portion of the pipe section having the openings to close said gap and fully align said openings with the latch screws while preloading the connection to a desired strength for connecting the pipe sections together.

2. A connector for mechanically securing first and second pipe sections in a desired force transmitting end to end relationship, comprising:

end portions on the first and second pipe sections which are shaped and dimensioned so that the end portion of the first pipe section can be inserted in the end portion of the second pipe section, stop means for limiting telescopic penetration of the first pipe section relative to the second pipe section, said stop means includes engageable tapered surfaces located respectively on the outer surface of the first pipe section and the inner surface of the second pipe section which are adapted to engage each other when the first pipe section is inserted in the second pipe section, the first pipe section forming an outer end and the inner surface of the second pipe section having a shoulder formed therein, said outer end and shoulder forming a gap when the tapered surfaces engage each other to limit penetration;

one of the pipe sections including a plurality of helically threaded circumferentially spaced holes opening on the side facing the other pipe section;

a corresponding plurality of threaded latch screws with threads for mating with the threads in the holes, the latch screws being shaped and dimensioned to be received into the threaded holes to an extent that the first section can be inserted in the second pipe section;

the other pipe section including a like plurality of circumferentially spaced openings located therein so that when the first pipe section is inserted in the second pipe section the openings will be substantially aligned with the latch screws;

a portion of each latch screw being exposed to the exterior of the second pipe section, and the exposed portion of the latch screws including engaging means so that the latch screws can be engaged and rotated for moving a portion of the latch screws into the substantially aligned openings for longitudinally straining a portion of the pipe section having the openings to close said gap and fully align said openings with the latch screws while preloading the connection to a desired strength for connecting the pipe sections together.

3. A first pipe section which can be used as part of a mechanical connector between first and second pipe sections, wherein one of the first and second pipe sections can be telescopically inserted in the other pipe section a predetermined distance, including:

a first pipe section having an outer end and a tapered surface, a plurality of helically threaded circumferentially spaced holes formed therein opening on the side facing the second pipe section and adapted to receive threaded latch screws with threads for mating with the threads in the holes and which are adapted to be received in the threaded holes to an extent that the first pipe section can be inserted in the second pipe section;

said plurality of holes being located so that the latch screws are substantially aligned with a corresponding plurality of openings located in the second pipe section when the first pipe section is inserted into the second pipe section so that the latch screws can be rotated and partially moved into the openings for connecting the two pipe sections;

said first pipe section having a tapered outer surface formed thereon which is adapted to engage a cooperating tapered surface formed on the second pipe section when the first pipe section is inserted in the second pipe section the predetermined distance, a gap being formed between the outer end of the first pipe section and a shoulder formed in the inner surface of the second pipe section, each of the plurality openings located in the second pipe section having a tapered portion, the holes in the first pipe section being located relative to the openings in the second pipe section so that when the first pipe section is inserted in the second pipe section and the latch screws are moved into the openings, the latch screws first engage the edge of the tapered openings away from the end of the first pipe section and move a portion of the second pipe section longitudinally for closing said gap and preloading the connector.

4. A first pipe section which can be used as part of a mechanical connector between first and second pipe sections, wherein one of the first and second pipe sections can be telescopically inserted in the other pipe section a predetermined distance, including:

a first pipe section having an outer end and a tapered surface, a plurality of helically threaded holes formed therein opening on the side facing the second pipe section and adapted to receive threaded latch screws with threads for mating with the threads in the holes and which are adapted to be received in the threaded holes an extent that the first pipe section can be inserted in the second pipe section;

said plurality of holes being located so that the latch screws are substantially aligned with a corresponding plurality of openings located in the second pipe section when the first pipe sections is inserted in the second pipe section, so that the latch screws can be rotated and partially moved into the openings for connecting the two pipe sections;

said outer end of the first pipe section adapted to engage a shoulder formed in the inner surface of the second pipe section when the first pipe section is inserted in the second pipe section the predetermined distance, a gap being formed between a tapered surface formed on said first pipe section and a second cooperating tapered surface formed in the second pipe surface, each of the plurality of openings located in the second pipe section having a tapered portion, the holes in the first pipe section being located relative to the openings in the second pipe section so that when the first pipe section is inserted in the second pipe section and the latch screws are moved into the openings, the latch screws first engage the edge of the tapered openings away from the end of the first pipe section and move a portion of the second pipe section longitudinally for closing the gap and preloading the connector.

5. A first pipe section which can be used as part of a mechanical connector between first and second pipe sections, wherein one of the first and second pipe sections can be telescopically inserted in the other pipe section a predetermined distance, including:

a first pipe section having an outer end, a cooperating shoulder formed on the outer surface and a tapered surface, a plurality of helically threaded circumferentially spaced holes formed therein opening on the side facing the second pipe section and adapted to receive threaded latch screws with threads for mating with the threads in the holes and which are adpated to be received in the threaded holes an extent that the first pipe section can be inserted in the second pipe section;

said plurality of holes being located so that the latch screws are aligned with a corresponding plurality of openings located in the second pipe section when the first pipe section is inserted in the second pipe section, so that the latch screws can be rotated and partially moved into the openings for connecting the two pipe sections;

said outer end thereof is adapted to engage a shoulder formed on the inner surface of the second pipe section, a slight gap being formed between said tapered surface and a second cooperating tapered surface formed on the second pipe section, each of the plurality of openings located in the second pipe section having a tapered portion with the holes in the first pipe section being located relative to the openings in the second pipe section so that when the first pipe section is inserted in the second pipe section and the latch screws are moved into the openings, the latch screws first engage the edge of the tapered openings away from the end of the first pipe section and move a portion of the second pipe section for closing the gap formed by said tapered surfaces and engaging said cooperating shoulder with a cooperating shoulder formed on the second pipe section while preloading the connector.

6. A second pipe section adapted to be used as part of a mechanical connector between first and second pipe sections, wherein one of the first and second pipe sections can be telescopically inserted in the other pipe section a predetermined distance, including:

a second pipe section having an inner surface forming a shoulder and having a tapered outer surface formed thereon, a plurality of openings formed therein and located so that when the first pipe section is inserted in the second pipe section, each of said plurality of openings are aligned with one of a corresponding plurality of threaded latch screws located in helically threaded holes in the other pipe section, a portion of each latch screw being exposed to the exterior of the other pipe so that the latch screws can be rotated and moved into the openings for connecting the first and second pipe sections;

said tapered outer surface formed on said second pipe section which is adapted to engage a cooperating tapered surface formed on the first pipe surface when the first pipe section is inserted in the second pipe section, a gap being formed between the outer end of the first pipe section and said shoulder formed in the inner surface of the second pipe section, each of said plurality of openings located in the second pipe section having a tapered portion with the holes in the first pipe section being located relative to the openings in the second pipe section so that when the first pipe section is inserted in the second pipe section and the latch screws are moved into the openings the latch screws first engage the edge of the tapered openings away from the end of the first pipe section to move a portion of the second pipe section for closing the gap and preloading the connector.

7. A second pipe section adapted to be used as part of a mechanical connector between first and second pipe sections, wherein one of the first and second pipe sections can be telescopically inserted in the other pipe section a predetermined distance, including:
- a second pipe section having an inner surface forming a shoulder and having a tapered outer surface formed thereon,
- a plurality of openings formed therein located so that when the first pipe section is inserted in the second pipe section, each of said plurality of openings are aligned with one of a corresponding plurality of threaded latch screws located in helically threaded holes in the other pipe section, a portion of each latch screw being exposed to the exterior of the other pipe section so that the latch screws can be rotated and moved into the openings for connecting the first and second pipe sections,
- said shoulder formed in the inner surface of said second pipe section is adapted to engage the outer end of the first pipe section when the first pipe section is inserted in the second pipe section, a gap being formed between said tapered surface formed on said second pipe section and a second cooperating tapered surface formed in the first pipe surface,
- each of said plurality of openings located in the second pipe section having a tapered portion with the holes in the first pipe section being located relative to the openings in the second pipe section so that when the first pipe section is inserted in the second pipe section and the latch screws are moved into the openings, the latch screws first engage the edge of the tapered openings away from the end of the first pipe section to move a portion of the second pipe section for closing the gap and preloading the connector.

* * * * *